United States Patent
Liu et al.

(10) Patent No.: US 10,146,728 B2
(45) Date of Patent: Dec. 4, 2018

(54) USB CONTROL CIRCUIT WITH BUILT-IN SIGNAL REPEATER CIRCUIT

(71) Applicant: Realtek Semiconductor Corp., Hsinchu (TW)

(72) Inventors: Chong Liu, Suzhou (CN); Luo-Bin Wang, Suzhou (CN); Jian-Jhong Zeng, New Taipei (TW); Neng-Hsien Lin, Kaohsiung (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 257 days.

(21) Appl. No.: 15/190,898

(22) Filed: Jun. 23, 2016

(65) Prior Publication Data
US 2017/0011001 A1 Jan. 12, 2017

(30) Foreign Application Priority Data
Jul. 7, 2015 (CN) .......................... 2015 1 0393436

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 6,732,218 B2 | 5/2004 | Overtoom et al. |
| 7,152,190 B2 | 12/2006 | Overtoom |

(Continued)

FOREIGN PATENT DOCUMENTS

| TW | I365380 B | 6/2012 |

OTHER PUBLICATIONS

U.S. Office Action for U.S. Appl. No. 15/188,160, dated Dec. 1, 2017.

(Continued)

*Primary Examiner* — Henry Tsai
*Assistant Examiner* — Aurangzeb Hassan
(74) *Attorney, Agent, or Firm* — Birch, Stewart, Kolasch & Birch, LLP

(57) ABSTRACT

A USB control circuit of a USB hub device includes: an upstream MAC-layer circuit; a downstream MAC-layer circuit; a first USB PHY-layer circuit; a second USB PHY-layer circuit; a first switch circuit for communicating data with an upstream port through the first USB PHY-layer circuit; a second switch circuit for communicating data with a downstream port through the second USB PHY-layer circuit; a control signal transmission interface; a signal repeater circuit; and a control unit configured to operably control the first switch circuit and the second switch circuit through the control signal transmission interface, so that the first switch circuit selectively couples the upstream MAC-layer circuit or the signal repeater circuit with the first USB PHY-layer circuit, while the second switch circuit selectively couples the downstream MAC-layer circuit or the signal repeater circuit with the second USB PHY-layer circuit.

7 Claims, 3 Drawing Sheets

(56) References Cited

U.S. PATENT DOCUMENTS

| | | | |
|---|---|---|---|
| 7,480,753 B2 | 1/2009 | Bohm et al. | |
| 8,195,861 B2 | 6/2012 | Chen | |
| 2007/0255885 A1* | 11/2007 | Bohm | G06F 13/4022 710/316 |
| 2007/0294494 A1* | 12/2007 | Conti | G06F 12/123 711/158 |
| 2011/0179201 A1* | 7/2011 | Monks | G06F 13/387 710/60 |
| 2013/0054866 A1 | 2/2013 | Saito | |
| 2013/0154550 A1* | 6/2013 | Balmefrezol | G06F 1/263 320/107 |
| 2015/0006919 A1* | 1/2015 | Cheng | G06F 1/26 713/300 |
| 2015/0214734 A1* | 7/2015 | Wu | G06F 1/26 307/80 |
| 2015/0227485 A1* | 8/2015 | Maung | G06F 13/4022 710/316 |
| 2015/0316943 A1* | 11/2015 | Tung | G06F 13/385 327/538 |
| 2016/0323435 A1 | 11/2016 | Antonopoulos et al. | |

OTHER PUBLICATIONS

Taiwanese Office Communication and Search Report from TIPO for Application No. 104128303, dated May 16, 2016.

\* cited by examiner

USB CONTROL CIRCUIT WITH BUILT-IN SIGNAL REPEATER CIRCUIT

CROSS-REFERENCE TO RELATED APPLICATIONS

This application claims the benefit of priority to Patent Application No. 201510393436.6, filed in China on Jul. 7, 2015; the entirety of which is incorporated herein by reference for all purposes.

BACKGROUND

The disclosure generally relates to a USB control circuit and, more particularly, to a USB control circuit with a built-in signal repeater circuit.

The USB hub device is a common data transmission equipment and utilized for converting and dispatching data between a USB host device and a USB peripheral device. The USB hub device includes an upstream port for connecting with the USB host device and a downstream port for connecting with the USB peripheral device.

The supplementary specification of the USB protocol has defined an On-the-Go (OTG) function, which allows a USB peripheral device supporting the OTG function (a.k.a. an OTG device) to selectively play the role of a USB host device or a USB peripheral device in different situations. Accordingly, the OTG device is categorized as a dual role device.

However, the devices to be connected to the upstream port and the downstream port of the conventional USB hub device are not swappable. Otherwise, data communication between the USB host device and the USB peripheral device cannot be conducted successfully through the conventional USB hub device. For example, when the OTG device is connected to the upstream port of the conventional USB hub device, the OTG device is only allowed to play the role of a USB host device, and not allowed to play the role of a USB peripheral device. On the other hand, when the OTG device is connected to the downstream port of the conventional USB hub device, the OTG device is only allowed to play the role of a USB peripheral device, and not allowed to play the role of a USB host device.

As a result, when two OTG devices are respectively connected to the upstream port and the downstream port of the conventional USB hub device, the roles of the two OTG devices are restricted and cannot be swapped.

It is apparent that the conventional USB hub device severely restricts the functions of the OTG devices, thereby reducing the usage flexibility of the OTG devices.

SUMMARY

An example embodiment of a USB control circuit of a USB hub device is disclosed. The USB hub device comprises an upstream port and a downstream port. The USB control circuit comprises: an upstream MAC-layer circuit; a downstream MAC-layer circuit; a first USB PHY-layer circuit; a second USB PHY-layer circuit; a first switch circuit, arranged to operably communicate data with the upstream port through the first USB PHY-layer circuit; a second switch circuit, arranged to operably communicate data with the downstream port through the second USB PHY-layer circuit; a control signal transmission interface, coupled with the first switch circuit and the second switch circuit; a signal repeater circuit, coupled between the first switch circuit and the second switch circuit; and a control unit, coupled with the control signal transmission interface, arranged to operably control the first switch circuit and the second switch circuit through the control signal transmission interface, so that the first switch circuit selectively couples one of the upstream MAC-layer circuit and the signal repeater circuit to the first USB PHY-layer circuit while the second switch circuit selectively couples one of the downstream MAC-layer circuit and the signal repeater circuit to the second USB PHY-layer circuit; wherein when the control unit controls the first switch circuit to couple the signal repeater circuit with the first USB PHY-layer circuit, the control unit also controls the second switch circuit to couple the signal repeater circuit with the second USB PHY-layer circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
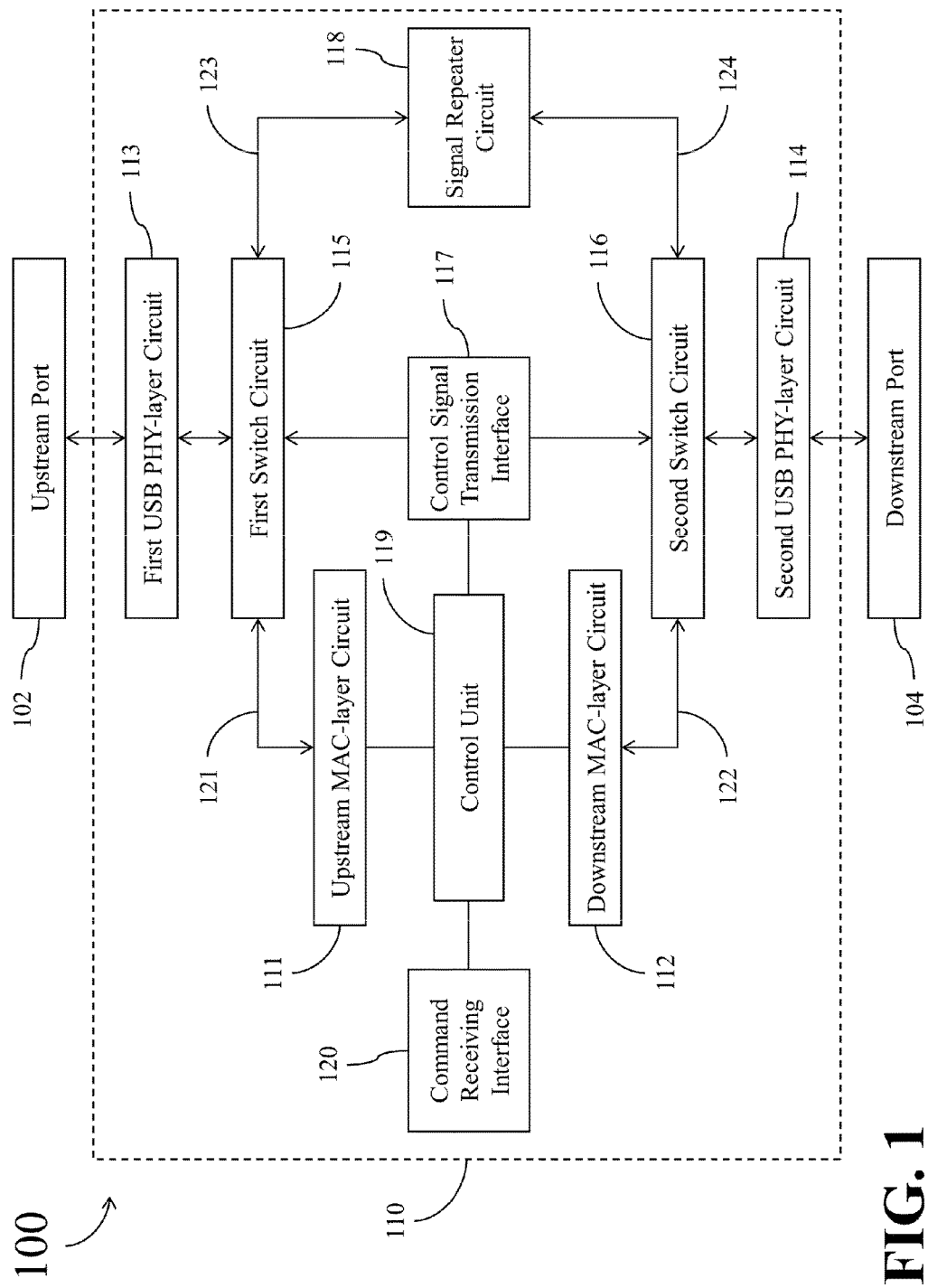
FIG. 1 shows a simplified functional block diagram of a USB hub device according to one embodiment of the present disclosure.

FIG. 1 shows a simplified functional block diagram of a USB hub device 100 according to one embodiment of the present disclosure. The USB hub device 100 comprises an upstream port 102, a downstream port 104, and a USB control circuit 110. In the embodiment of FIG. 1, the USB control circuit 110 comprises an upstream MAC-layer circuit 111, a downstream MAC-layer circuit 112, a first USB PHY-layer circuit 113, a second USB PHY-layer circuit 114, a first switch circuit 115, a second switch circuit 116, a control signal transmission interface 117, a signal repeater circuit 118, a control unit 119, and a command receiving interface 120.

In the USB control circuit 110, the first switch circuit 115 is arranged to operably communicate data the upstream port 102 through the first USB PHY-layer circuit 113. The first USB PHY-layer circuit 113 is arranged to operably decode/encode the data to be transmitted between the first switch circuit 115 and the upstream port 102. The second switch circuit 116 is arranged to operably communicate data with the downstream port 104 through the second USB PHY-layer circuit 114. The second USB PHY-layer circuit 114 is arranged to operably decode/encode the data to be transmitted between the second switch circuit 116 and the downstream port 104. The control signal transmission interface 117 is coupled with the first switch circuit 115 and the second switch circuit 116. The signal repeater circuit 118 is coupled between the first switch circuit 115 and the second switch circuit 116. The control unit 119 is coupled with the control signal transmission interface 117 and arranged to operably control the first switch circuit 115 and the second switch circuit 116 through the control signal transmission interface 117, so that the first switch circuit 115 selectively couples one of the upstream MAC-layer circuit 111 and the signal repeater circuit 118 to the first USB PHY-layer circuit 113 while the second switch circuit 116 selectively couples one of the downstream MAC-layer circuit 112 and the signal repeater circuit 118 to the second USB PHY-layer circuit 114. The command receiving interface 120 is coupled with the control unit 119 and arranged to operably receive a predetermined command from an external circuit (e.g., a switch device or a button arranged on the USB hub device 100).

As shown in FIG. 1, a first signal channel 121 is arranged between the first switch circuit 115 and the upstream MAC-layer circuit 111; a second signal channel 122 is arranged between the second switch circuit 116 and the downstream MAC-layer circuit 112; a third signal channel 123 is arranged between the first switch circuit 115 and the signal repeater circuit 118; and a fourth signal channel 124 is arranged between the second switch circuit 116 and the signal repeater circuit 118. The signal repeater circuit 118 is arranged to operably repeat the signal transmitted through the third signal channel 123 and the fourth signal channel 124, so that the first switch circuit 115 and the second switch circuit 116 can communicate data through the third signal channel 123 and the fourth signal channel 124. In practice, each of the first switch circuit 115 and the second switch circuit 116 may be realized with a multiplexer.

The control unit 119 may control the first switch circuit 115 to switch to either the first signal channel 121 or the third signal channel 123 while control the second switch circuit 116 to switch to either the second signal channel 122 or the fourth signal channel 124, so as to change the operating mode of the USB hub device 100.

Under the control of the control unit 119, the USB hub device 100 may be configured to operate in a common mode or in a bypass mode.

Figure 2:
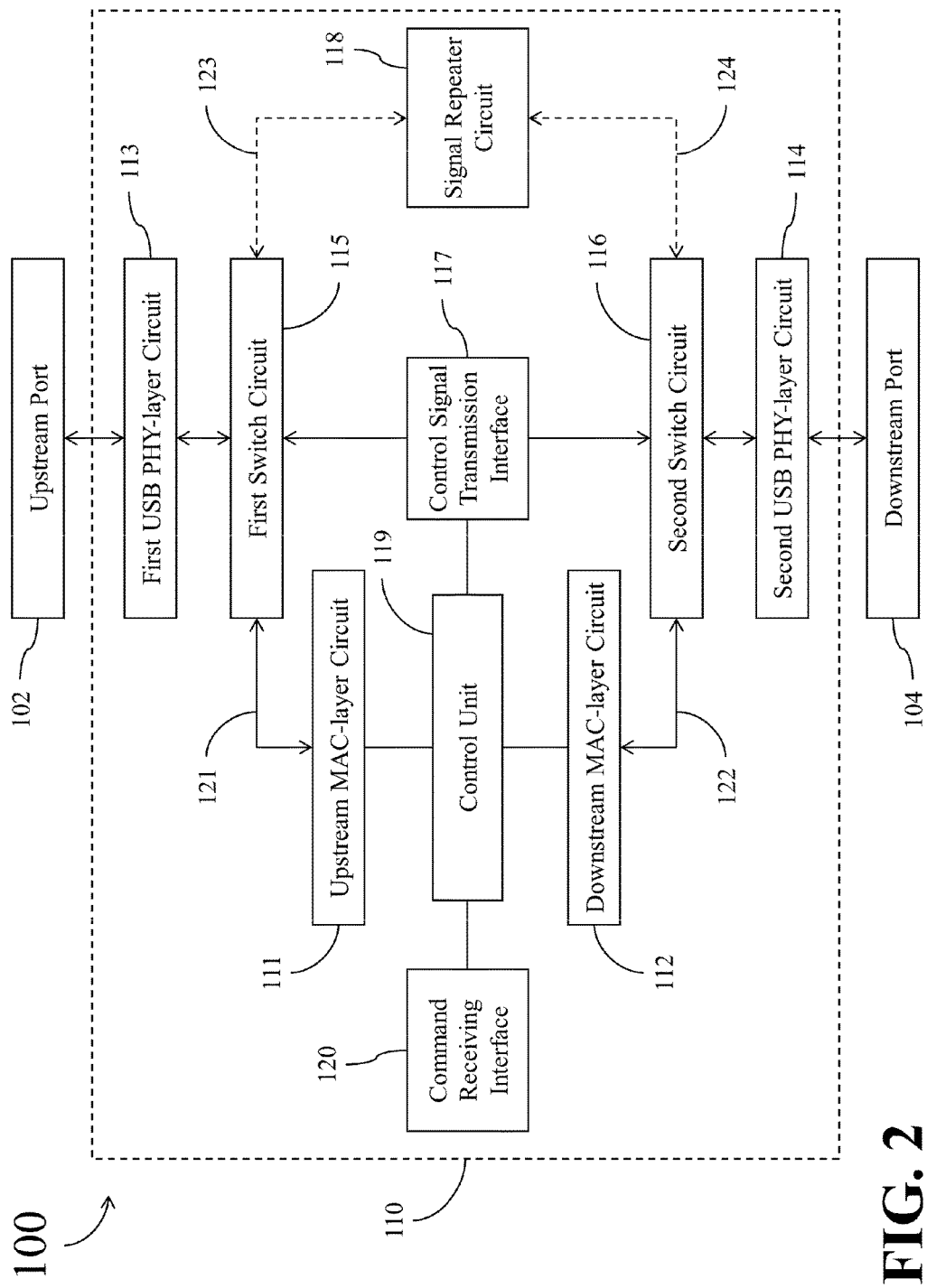
FIG. 2 shows a simplified schematic architecture of the USB hub device of FIG. 1 when it operating in a common mode.

Please refer to FIG. 2, which shows a simplified schematic architecture of the USB hub device 100 when it operating in a common mode.

The control unit 119 may control the first switch circuit 115 to switch to the first signal channel 121 through the control signal transmission interface 117, and also control the second switch circuit 116 to switch to the second signal channel 122 through the control signal transmission interface 117, so as to configure the USB hub device 100 to operate in the common mode. In this situation, the signal repeater circuit 118 needs not to operate and the third signal channel 123 and the fourth signal channel 124 are in an inactive status, and thus the third signal channel 123 and the fourth signal channel 124 are illustrated with dotted lines.

In other words, the control unit 119 controls he first switch circuit 115 to couple the upstream MAC-layer circuit 111 to the first USB PHY-layer circuit 113 and also controls the second switch circuit 116 to couple the downstream MAC-layer circuit 112 to the second USB PHY-layer circuit 114 in the common mode. That is, when the control unit 119 controls he first switch circuit 115 to couple the upstream MAC-layer circuit 111 to the first USB PHY-layer circuit 113, the control unit 119 also simultaneously controls the second switch circuit 116 to couple the downstream MAC-layer circuit 112 to the second USB PHY-layer circuit 114.

In the common mode, the USB hub device 100 functions like a conventional USB hub device and acts as a data intermediate device between a host device connecting to the upstream port 102 and a device connecting to the downstream port 104. Accordingly, the upstream port 102 of the USB hub device 100 can be employed to connect to a USB host device or a first OTG device playing the role of the USB host device, while the downstream port 104 can be employed to connect to a USB peripheral device or a second OTG device playing the role of the USB peripheral device.

Figure 3:
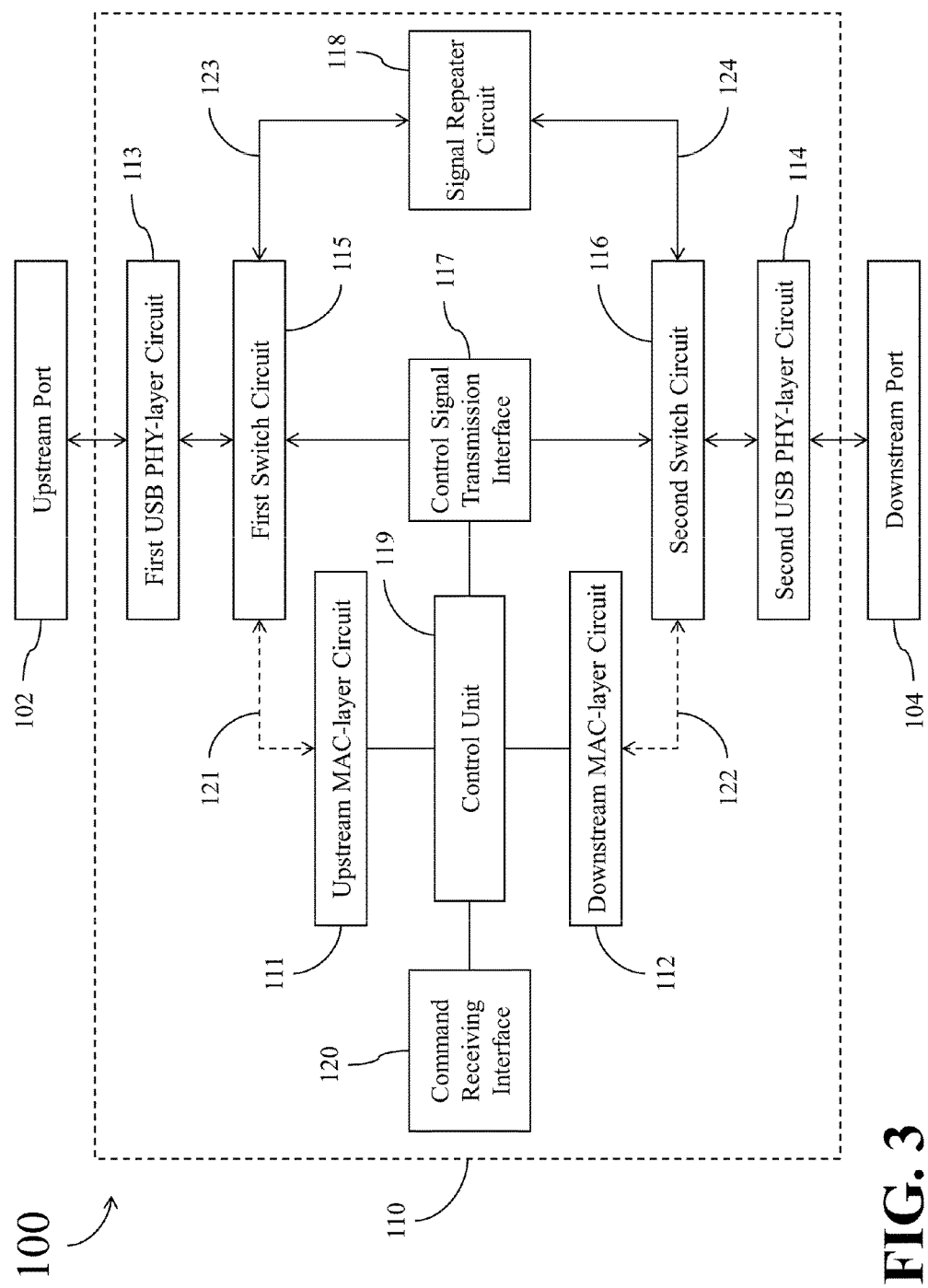
FIG. 3 shows a simplified schematic architecture of the USB hub device of FIG. 1 when it operating in a bypass mode.

Please refer to FIG. 3, which shows a simplified schematic architecture of the USB hub device 100 when it operating in a bypass mode.

The control unit 119 may control the first switch circuit 115 to switch to the third signal channel 123 through the control signal transmission interface 117 and also control the second switch circuit 116 to switch to the fourth signal channel 124 through the control signal transmission interface 117, so as to configure the USB hub device 100 to operate in the bypass mode. In this situation, the first signal channel 121 and the second signal channel 122 are both in an inactive status, and thus they are illustrated with dotted lines. In the bypass mode, the signal repeater circuit 118 is arranged to operably repeat the signal transmitted through the third signal channel 123 and the fourth signal channel 124, so that the first switch circuit 115 and the second switch circuit 116 can communicate data through the third signal channel 123 and the fourth signal channel 124.

In other words, the control unit 119 controls the first switch circuit 115 to couple the signal repeater circuit 118 to the first USB PHY-layer circuit 113 and also controls the second switch circuit 116 to couple the signal repeater circuit 118 to the second USB PHY-layer circuit 114 in the bypass mode. That is, the control unit 119 controls the first switch circuit 115 to couple the signal repeater circuit 118 to the first USB PHY-layer circuit 113, the control unit 119 also simultaneously controls the second switch circuit 116 to couple the signal repeater circuit 118 to the second USB PHY-layer circuit 114.

In the bypass mode, the upstream MAC-layer circuit 111 and the downstream MAC-layer circuit 112 of the USB hub device 100 are both bypassed by a bypass structure formed by the first switch circuit 115, the second switch circuit 116, and the signal repeater circuit 118. In this situation, the roles of the upstream port 102 and the downstream port 104 are no longer restricted.

For example, in the situation where the upstream port 102 is connected to a first OTG device, the downstream port 104 is connected to a USB host device or a second OTG device play the role of a USB host device, the first switch circuit 115 couples the signal repeater circuit 118 to the first USB PHY-layer circuit 113, and the second switch circuit 116 couples the signal repeater circuit 118 to the second USB PHY-layer circuit 114, the first OTG device is enabled to operate as a USB peripheral device and to communicate data with the second OTG device (or the USB host device) through the third signal channel 123 and the fourth signal channel 124.

For another example, in the situation where the upstream port 102 is connected to a first OTG device, the downstream port 104 is connected to a USB peripheral device or a second OTG device playing the role of a USB peripheral device, the first switch circuit 115 couples the signal repeater circuit 118 to the first USB PHY-layer circuit 113, and the second switch circuit 116 couples the signal repeater circuit 118 to the second USB PHY-layer circuit 114, the first OTG device is enabled to operate as a USB host device and to communicate data with the second OTG device (or the USB peripheral device) through the third signal channel 123 and the fourth signal channel 124.

For another example, in the situation where the upstream port 102 is connected to a USB host device or a first OTG device playing the role of a USB host device, the downstream port 104 is connected to a second OTG device, the first switch circuit 115 couples the signal repeater circuit 118 to the first USB PHY-layer circuit 113, and the second switch circuit 116 couples the signal repeater circuit 118 to the second USB PHY-layer circuit 114, the second OTG device is enabled to operate as a USB peripheral device and to communicate data with the first OTG device (or the USB host device) through the third signal channel 123 and the fourth signal channel 124.

For another example, in the situation where the upstream port 102 is connected to a USB peripheral device or a first OTG device playing the role of a USB peripheral device, the downstream port 104 is connected to a second OTG device, the first switch circuit 115 couples the signal repeater circuit 118 to the first USB PHY-layer circuit 113, and the second switch circuit 116 couples the signal repeater circuit 118 to the second USB PHY-layer circuit 114, the second OTG device is enabled to operate as a USB host device and to communicate data with the first OTG device (or the USB peripheral device) through the third signal channel 123 and the fourth signal channel 124.

It can be appreciated from the foregoing descriptions, in the bypass mode, the upstream port 102 of the USB hub device 100 can be employed to connect to a USB peripheral device or a first OTG device playing the role of the USB peripheral device, while the downstream port 104 can be employed to connect to a USB host device or a second OTG device playing the role of the USB host device. Alternatively, the upstream port 102 of the USB hub device 100 can be employed to connect to a USB host device or a first OTG device playing the role of the USB host device, while the downstream port 104 can be employed to connect to a USB peripheral device or a second OTG device playing the role of the USB peripheral device. From another aspect, an OTG device connecting to the upstream port 102 in the bypass mode is enabled to operate as a USB peripheral device. Similarly, an OTG device connecting to the downstream port 104 in the bypass mode is enabled to operate as a USB host device.

In the bypass mode, since the upstream MAC-layer circuit 111 and the downstream MAC-layer circuit 112 of the USB hub device 100 are bypassed, the upstream MAC-layer circuit 111 and the downstream MAC-layer circuit 112 may be temporarily turned off to reduce the power consumption of the USB hub device 100. In addition, since the upstream port 102 and the downstream port 104 transmit signals through the third signal channel 123 and the fourth signal channel 124 without using the upstream MAC-layer circuit 111 and the downstream MAC-layer circuit 112 as intermediate circuits, the signal transmission delay can be reduced, thereby improving the transmission efficiency between the upstream port 102 and the downstream port 104.

In practice, the default operating mode of the USB hub device 100 may be configured to be the common mode, and the operating mode of the USB hub device 100 may be switched to the bypass mode when the control unit 119 receives a predetermined command. That is, the control unit 119 may control the first switch circuit 115 to couple the signal repeater circuit 118 to the first USB PHY-layer circuit 113 and also control the second switch circuit 116 to couple the signal repeater circuit 118 to the second USB PHY-layer circuit 114 when the control unit 119 receives a predetermined command.

In this embodiment, for example, when the user manipulates the aforementioned external circuit (e.g., a switch device or a button arranged on the USB hub device 100), the command receiving interface 120 receives a predetermined command from the external circuit and then transmits the predetermined command to the control unit 119, so as to instruct the control unit 119 to switch the operating mode of the USB hub device 100 to the bypass mode.

In practice, the USB hub device 100 may provide a software application program for the user to input the predetermined command, so that the predetermined command is transmitted to the control unit 119 by the software application program. In this situation, the command receiving interface 120 may be omitted to simplify the circuitry structure of the USB hub device 100.

Additionally, the control unit 119 may be configured to switch the operating mode of the USB hub device 100 to the bypass mode when the upstream port 102 and the downstream port 104 are both connecting to devices while the other connection ports (not shown in figures) of the USB hub device 100 are not connecting to any device, so as to reduce power consumption and improve signal transmission efficiency.

It can be appreciated from the foregoing descriptions that the USB control circuit 110 utilizes the combination of the first switch circuit 115, the second switch circuit 116, and the signal repeater circuit 118 to provide a bypass structure which the conventional USB hub device lacks, and is thus enabled to flexibly switch the roles of the OTG devices connecting to the USB hub device 100.

From another aspect, the USB control circuit 110 allows an OTG device connecting to the upstream port 102 to operate as a USB peripheral device and also allows an OTG device connecting to the downstream port 104 to operate as a USB host device.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The tem "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A USB control circuit (110) of a USB hub device (100), wherein the USB hub device (100) comprises an upstream port (102) and a downstream port (104), the USB control circuit (110) comprising:
   an upstream MAC-layer circuit (111);
   a downstream MAC-layer circuit (112);
   a first USB PHY-layer circuit (113);

a second USB PHY-layer circuit (114);
a first switch circuit (115), arranged to operably communicate data with the upstream port (102) through the first USB PHY-layer circuit (113);
a second switch circuit (116), arranged to operably communicate data with the downstream port (104) through the second USB PHY-layer circuit (114);
a control signal transmission interface (117), coupled with the first switch circuit (115) and the second switch circuit (116);
a signal repeater circuit (118), coupled between the first switch circuit (115) and the second switch circuit (116); and
a control unit (119), coupled with the control signal transmission interface (117), arranged to operably control the first switch circuit (115) and the second switch circuit (116) through the control signal transmission interface (117), so that the first switch circuit (115) selectively couples one of the upstream MAC-layer circuit (111) and the signal repeater circuit (118) to the first USB PHY-layer circuit (113) while the second switch circuit (116) selectively couples one of the downstream MAC-layer circuit (112) and the signal repeater circuit (118) to the second USB PHY-layer circuit (114);
wherein when the control unit (119) controls the first switch circuit (115) to couple the signal repeater circuit (118) with the first USB PHY-layer circuit (113), the control unit (119) also controls the second switch circuit (116) to couple the signal repeater circuit (118) with the second USB PHY-layer circuit (114), the first switch circuit (115) is de-coupled from the upstream MAC-layer circuit (111) and the second switch circuit (116) is de-coupled from the downstream MAC-layer circuit (112) such that no signal is transmitted between the first switch circuit (115) and the upstream MAC-layer circuit (111) while no signal is transmitted between the second switch circuit (116) and the downstream MAC-layer circuit (112).

2. The USB control circuit (110) of claim 1, wherein when the upstream port (102) is connected to an OTG device, the downstream port (104) is connected to a USB host device, the first switch circuit (115) couples the signal repeater circuit (118) with the first USB PHY-layer circuit (113), and the second switch circuit (116) couples the signal repeater circuit (118) with the second USB PHY-layer circuit (114), the OTG device is enabled to operate as a USB peripheral device to communicate data with the USB host device.

3. The USB control circuit (110) of claim 1, wherein when a predetermined command is received by the control unit (119), the control unit (119) controls the first switch circuit (115) to couple the signal repeater circuit (118) with the first USB PHY-layer circuit (113) and also controls the second switch circuit (116) to couple the signal repeater circuit (118) with the second USB PHY-layer circuit (114).

4. The USB control circuit (110) of claim 3, further comprising:
a command receiving interface (120), coupled with the control unit (119), arranged to operably receive the predetermined command from an external circuit and to operably transmit the predetermined command to the control unit (119).

5. The USB control circuit (110) of claim 1, wherein the first switch circuit (115) or the second switch circuit (116) is a multiplexer.

6. The USB control circuit (110) of claim 1, wherein when the control unit (119) controls the first switch circuit (115) to couple the signal repeater circuit (118) with the first USB PHY-layer circuit (113) and also controls the second switch circuit (116) to couple the signal repeater circuit (118) with the second USB PHY-layer circuit (114), the upstream port (102) and the downstream port (104) transmit signals through the first switch circuit (115), the signal repeater circuit (118), and the second switch circuit (116) without using the upstream MAC-layer circuit (111) and the downstream MAC-layer circuit (112) as intermediate circuits.

7. The USB control circuit (110) of claim 6, wherein when the control unit (119) controls the first switch circuit (115) to couple the signal repeater circuit (118) with the first USB PHY-layer circuit (113) and also controls the second switch circuit (116) to couple the signal repeater circuit (118) with the second USB PHY-layer circuit (114), the upstream MAC-layer circuit (111) and the downstream MAC-layer circuit (112) are capable of being turned off to reduce power consumption.

* * * * *